US011444699B2

(12) United States Patent
Masuda et al.

(10) Patent No.: US 11,444,699 B2
(45) Date of Patent: Sep. 13, 2022

(54) OPTICAL TRANSMISSION SYSTEM, OPTICAL RECEIVING APPARATUS AND OPTICAL TRANSMISSION METHOD

(71) Applicant: NIPPON TELEGRAPH AND TELEPHONE CORPORATION, Tokyo (JP)

(72) Inventors: Akira Masuda, Musashino (JP); Fukutaro Hamaoka, Musashino (JP); Shuto Yamamoto, Musashino (JP); Seiji Okamoto, Musashino (JP); Kengo Horikoshi, Musashino (JP); Masanori Nakamura, Musashino (JP); Asuka Matsushita, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/424,766

(22) PCT Filed: Jan. 15, 2020

(86) PCT No.: PCT/JP2020/001017
§ 371 (c)(1),
(2) Date: Jul. 21, 2021

(87) PCT Pub. No.: WO2020/158385
PCT Pub. Date: Aug. 6, 2020

(65) Prior Publication Data
US 2022/0069921 A1 Mar. 3, 2022

(30) Foreign Application Priority Data

Jan. 30, 2019 (JP) .............................. JP2019-014621

(51) Int. Cl.
*H04B 10/69* (2013.01)
*H04B 10/548* (2013.01)
*H04B 10/67* (2013.01)

(52) U.S. Cl.
CPC ....... *H04B 10/6971* (2013.01); *H04B 10/548* (2013.01); *H04B 10/676* (2013.01)

(58) Field of Classification Search
CPC .............. H04B 10/6971; H04B 10/548; H04B 10/676
(Continued)

(56) References Cited

U.S. PATENT DOCUMENTS

| 8,929,750 B2* | 1/2015 | Ishihara ................. H04B 10/50 398/208 |
| 10,693,562 B2* | 6/2020 | Yamamoto ............. H04J 13/12 |
| 2016/0352362 A1* | 12/2016 | Fonseka ............. H03M 13/036 |
| 2018/0375607 A1* | 12/2018 | Shibahara ............. H04B 10/50 |

(Continued)

OTHER PUBLICATIONS

Majeed et al; 3 Gb/s Broadband Spectral Amplitude Coding Optical Code Division Multiple Access (SAC-OCDMA) Based on Multi Diagonal and Walsh Hadamard Codes; Sep. 2019; Journal of Communications vol. 14, No. 19;pp. 1-11. (Year: 2019).*

(Continued)

*Primary Examiner* — Amritbir K Sandhu (57) ABSTRACT

There are provided an optical transmission apparatus that subjects a transmission signal including a plurality of sequences to Hadamard transform to obtain a signal in which a predetermined delay is added to one of the sequences, optically modulates the obtained signal, and transmits the modulated signal, and an optical reception apparatus that demodulates a reception signal received from the optical transmission apparatus by subjecting the reception signal to adaptive equalization processing with a predetermined number of taps. The optical reception apparatus (Continued)

includes: an adaptive equalization processing unit that subjects the reception signal to adaptive equalization processing of wavelength distortion compensation with a number of taps obtained by subtracting a number in accordance with the delay from the predetermined number of taps; a delay compensation unit that subjects the reception signal subjected to the wavelength distortion compensation to delay compensation in accordance with the delay; and an inverse Hadamard transform unit that subjects the reception signal subjected to the delay compensation to inverse Hadamard transform.

6 Claims, 9 Drawing Sheets

(58) Field of Classification Search
USPC .......................................................... 398/161
See application file for complete search history.

(56) References Cited

U.S. PATENT DOCUMENTS

| | | | |
|---|---|---|---|
| 2021/0218476 A1* | 7/2021 | Masuda | H04B 10/6162 |
| 2022/0069921 A1* | 3/2022 | Masuda | H04B 10/2569 |

OTHER PUBLICATIONS

Majeed et al; 3 Gb/s Broadband Spectral Amplitude Coding Optical Code Division Multiple Access (SAC-OCDMA) Based on Multi Diagonal and Walsh Hadamard Codes; Sep. 2019; Journal of Communications vol. 14, No. 9; pp. 1-12. (Year: 2019).*

Shibahara et al; Filtering-tolerant transmission by the Walsh-Hadamard transform for super-channel beyond 100 Gb/s; May 2015; optical society of America; pp. 1-10. (Year: 2015).*

Wei-Ren Peng et al., Modified Walsh-Hadamard Transform for PDL Mitigation, 39th European Conference and Exhibition on Optical Communication (ECOC 2013), Sep. 22, 2013.

* cited by examiner

OPTICAL TRANSMISSION SYSTEM, OPTICAL RECEIVING APPARATUS AND OPTICAL TRANSMISSION METHOD

CROSS-REFERENCE TO RELATED APPLICATIONS

This application is a 371 U.S. National Phase of International Application No. PCT/JP2020/001017 filed on Jan. 15, 2020, which claims priority to Japanese Application No. 2019-014621 filed on Jan. 30, 2019. The entire disclosures of the above applications are incorporated herein by reference.

TECHNICAL FIELD

The present invention relates to an optical transmission system, an optical reception apparatus, and an optical transmission method.

BACKGROUND ART

In an optical transmission system, there is a polarization diversity scheme using Hadamard transform as a means to improve a tolerance for a polarization dependent loss (PDL) (for example, see Non Patent Literature 1).

Figure 5:
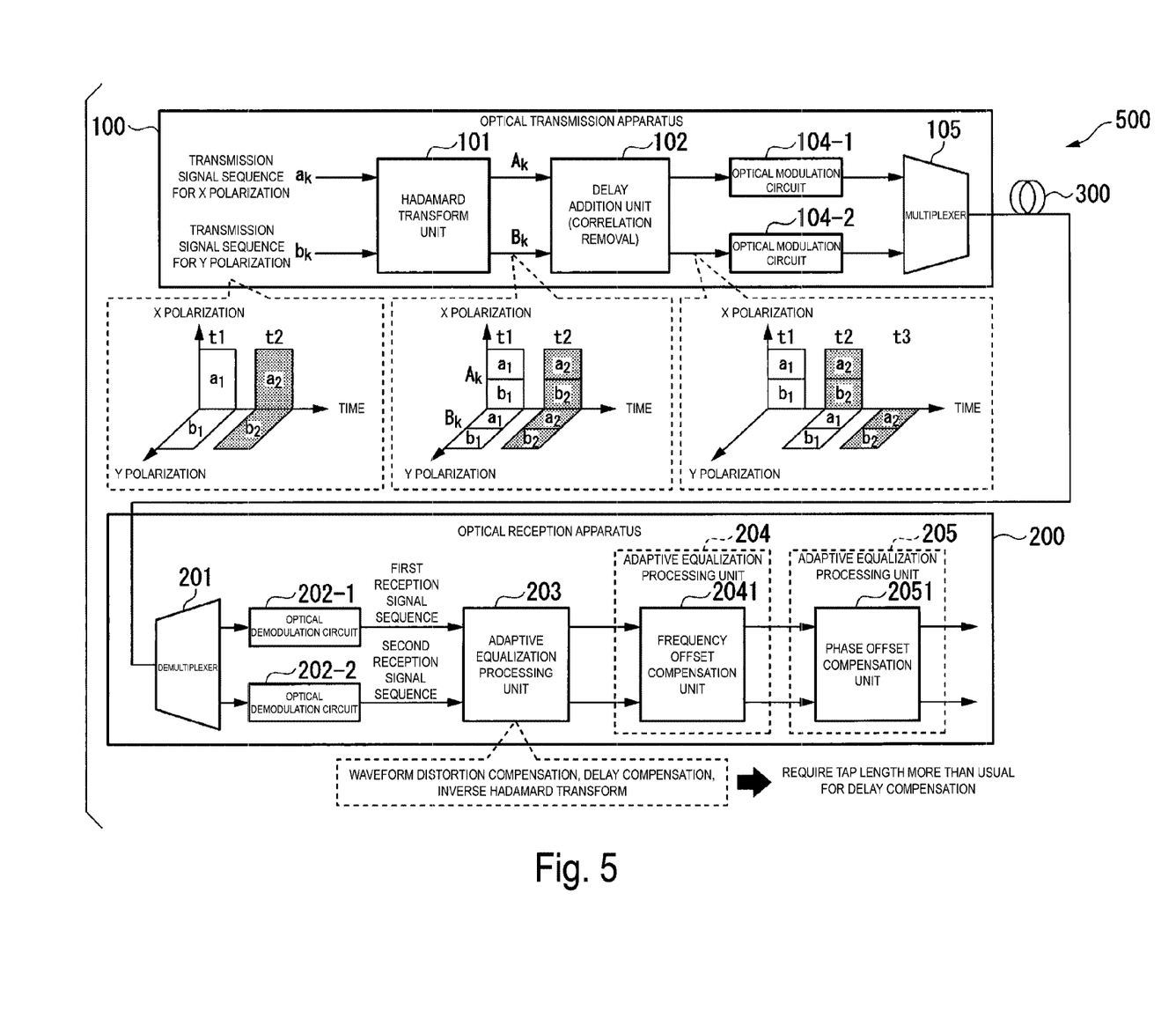
FIG. 5 is a block diagram illustrating an example of an optical transmission system employing a polarization diversity scheme using Hadamard transform.

FIG. 5 is a block diagram illustrating an example of an optical transmission system 500 that employs the polarization diversity scheme using Hadamard transform. In the optical transmission system 500, an Hadamard transform unit 101 included in an optical transmission apparatus 100 performs Hadamard transform that divides one signal component into X polarization and Y polarization.

As illustrated in FIG. 5, when two sequences of signals, a transmission signal sequence $a_k$ for X polarization and a transmission signal sequence $b_k$ for Y polarization, are input, the Hadamard transform unit 101 applies a matrix H in Equation (1) below to perform Hadamard transform. As a result, the Hadamard transform unit 101 generates and outputs a new signal $A_k$ for X polarization and a new signal $B_k$ for Y polarization. The new signal $A_k$ for X polarization and the new signal $B_k$ for Y polarization include both the transmission signal sequence $a_k$ for X polarization and the transmission signal sequence $b_k$ for Y polarization. This may reduce the PDL of the signal to be transmitted to improve a PDL tolerance.

[Math. 1]

$$H = \frac{1}{\sqrt{2}}\begin{bmatrix} 1 & 1 \\ 1 & -1 \end{bmatrix} \quad (1)$$

Figure 6:
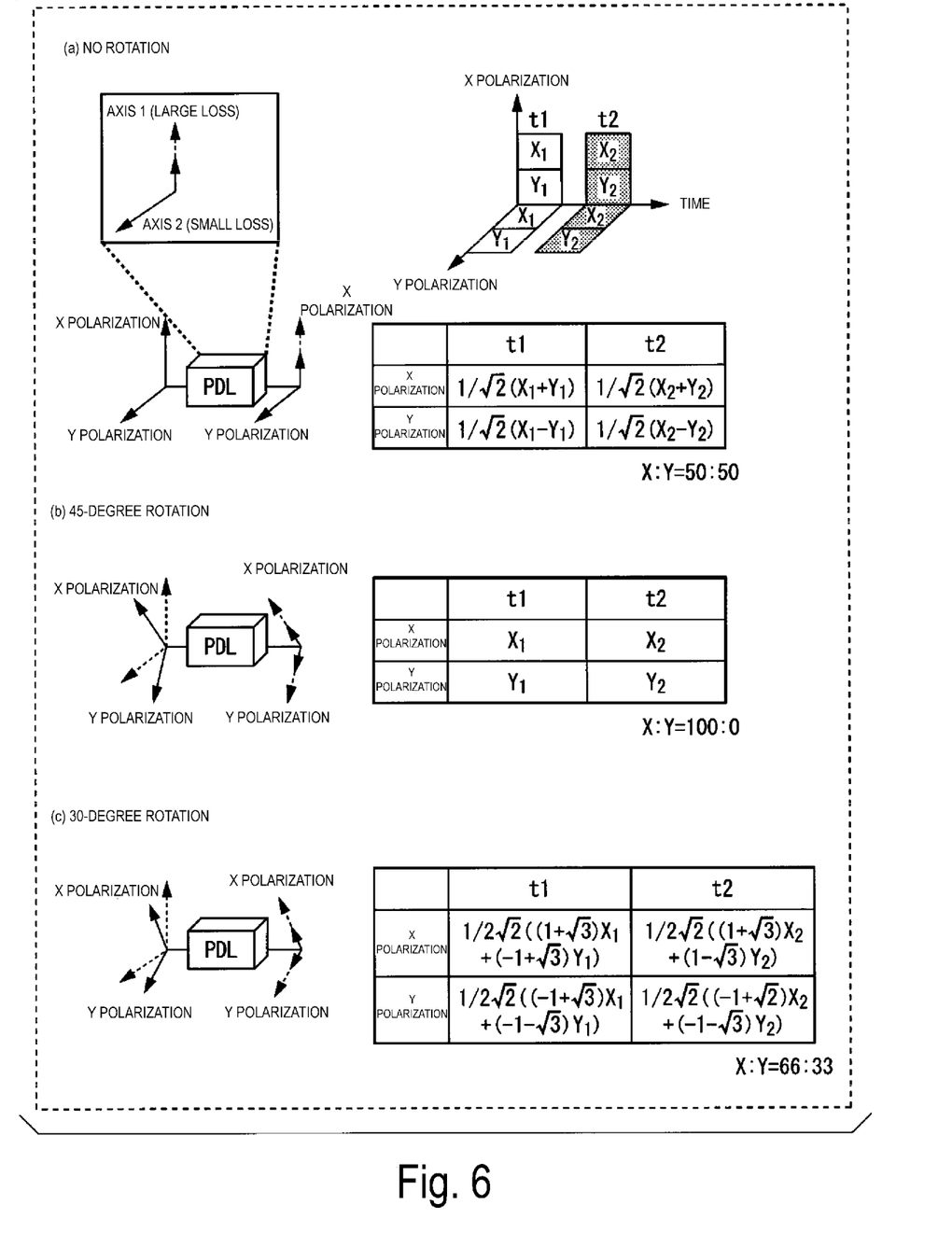
FIG. 6 is a diagram illustrating an assignation ratio of X polarization and Y polarization for each angle of SOP rotation.

However, even when the Hadamard transform is performed, the signal component divided into X polarization and Y polarization by the Hadamard transform may be biased to one polarization due to polarization rotation during transmission. For example, FIG. 6 is a diagram illustrating the bias to X polarization and Y polarization when a rotation angle of a state of polarization (SOP) is "0 degrees", "45 degrees", or "30 degrees". Note that the PDL of the transmission line is an example based on the assumption that a loss in the vertical direction (axis 1) is large and a loss in the horizontal direction (axis 2) is small.

When as illustrated in FIG. 6(a), there is no rotation, that is, the SOP rotation angle is "0 degrees", for example, a transmission signal $X_k$ for X polarization is subjected to Hadamard transform to be assigned to X polarization and Y polarization equally. As a result, the ratio of X polarization to Y polarization is 50:50, thereby not biasing the signal component.

In contrast, when the SOP rotation angle is "45 degrees" as illustrated in FIG. 6(b), for example, the transmission signal $X_k$ for X polarization is subjected to Hadamard transform to be assigned only to X polarization. As a result, the ratio of X polarization to Y polarization is 100:0, thereby biasing the signal component.

Furthermore, when the SOP rotation angle is "30 degrees" as illustrated in FIG. 6(c), for example, the transmission signal $X_k$ for X polarization is subjected to Hadamard transform to make the ratio of X polarization to Y polarization 66:33, thereby biasing the signal component.

In this way, polarization rotation in the transmission line causes the signal component to be biased. Thus, the optical transmission apparatus 100 illustrated in FIG. 5 includes a delay addition unit 102, and the delay addition unit 102 adds a delay to Y polarization by one time slot, for example.

Figure 7:
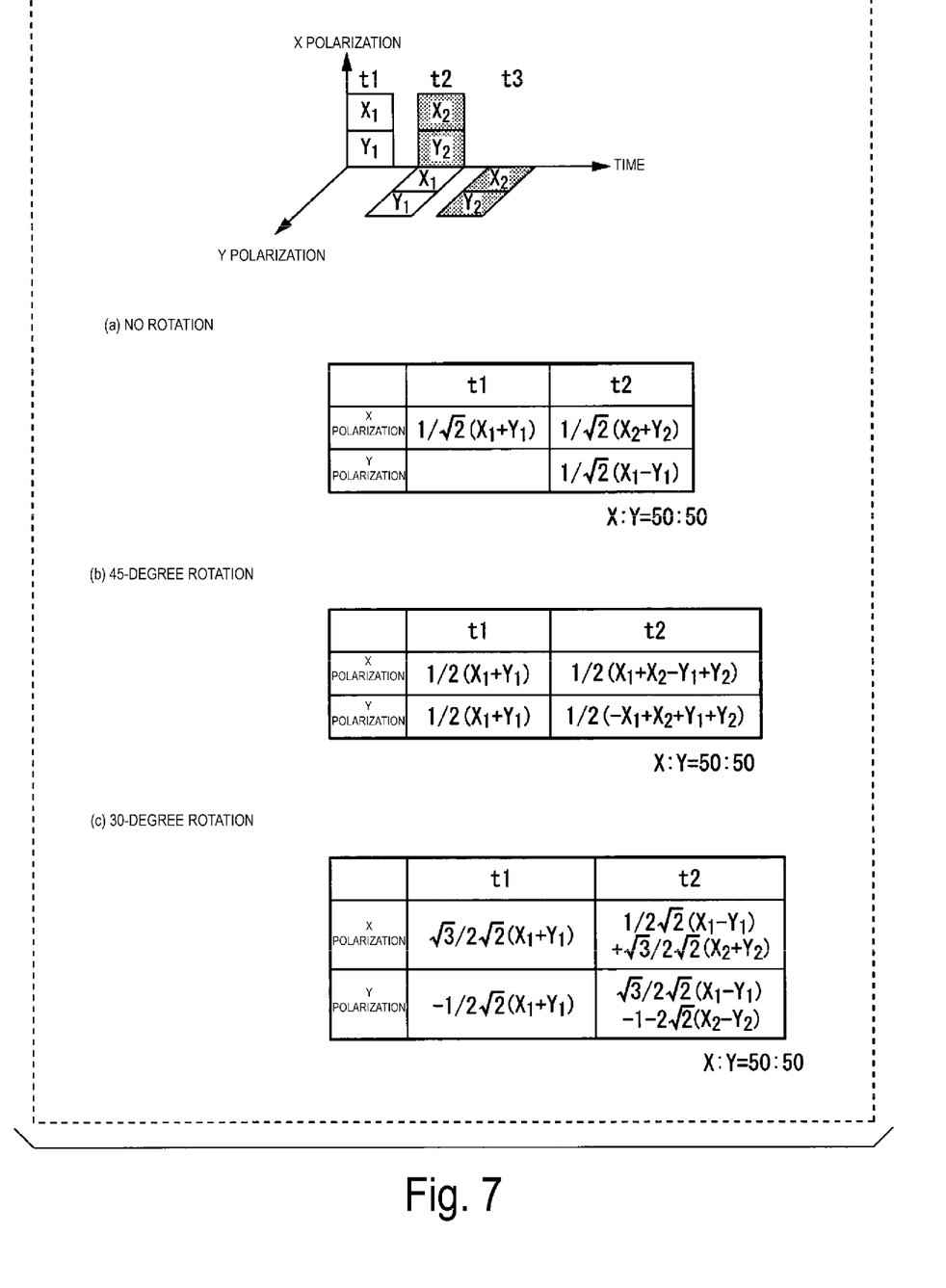
FIG. 7 is a diagram illustrating an assignation ratio of X polarization and Y polarization for each angle of SOP rotation when a delay is added.

By delaying Y polarization by one time slot, as illustrated in FIGS. 7(a), 7(b), and 7(c), even when the SOP rotation angle is any of "0 degrees," "45 degrees," and "30 degrees", the transmission signal is assigned to X polarization and Y polarization equally. As a result, the ratio of X polarization to Y polarization becomes 50:50, and the bias can be eliminated.

The delay addition unit 102 provides a delay to either X polarization or Y polarization to an extent that Hadamard transform cannot be canceled by a differential group delay (DGD). As a result, correlation between polarizations can be removed, and the effect of improving the PDL tolerance by Hadamard transform can be maintained regardless of presence or absence of SOP rotation.

Figure 8:
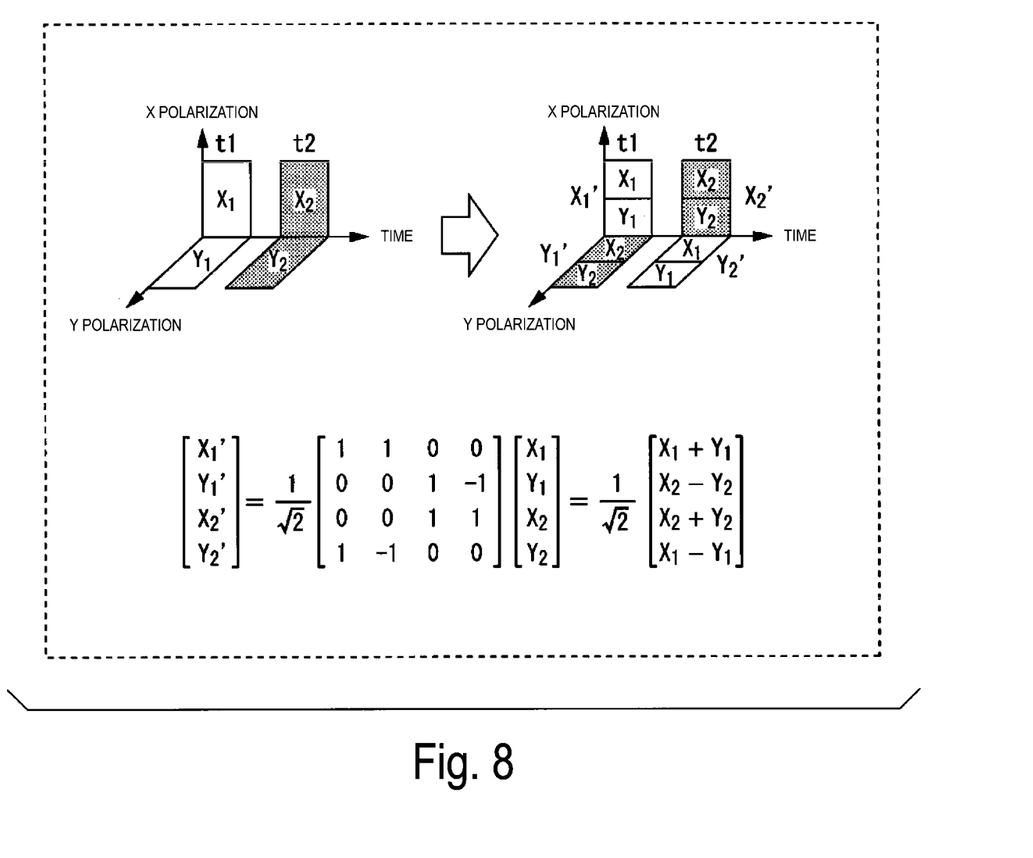
FIG. 8 is a diagram illustrating a technique for removing correlation between polarizations by expansion of an Hadamard matrix.
Figure 9:
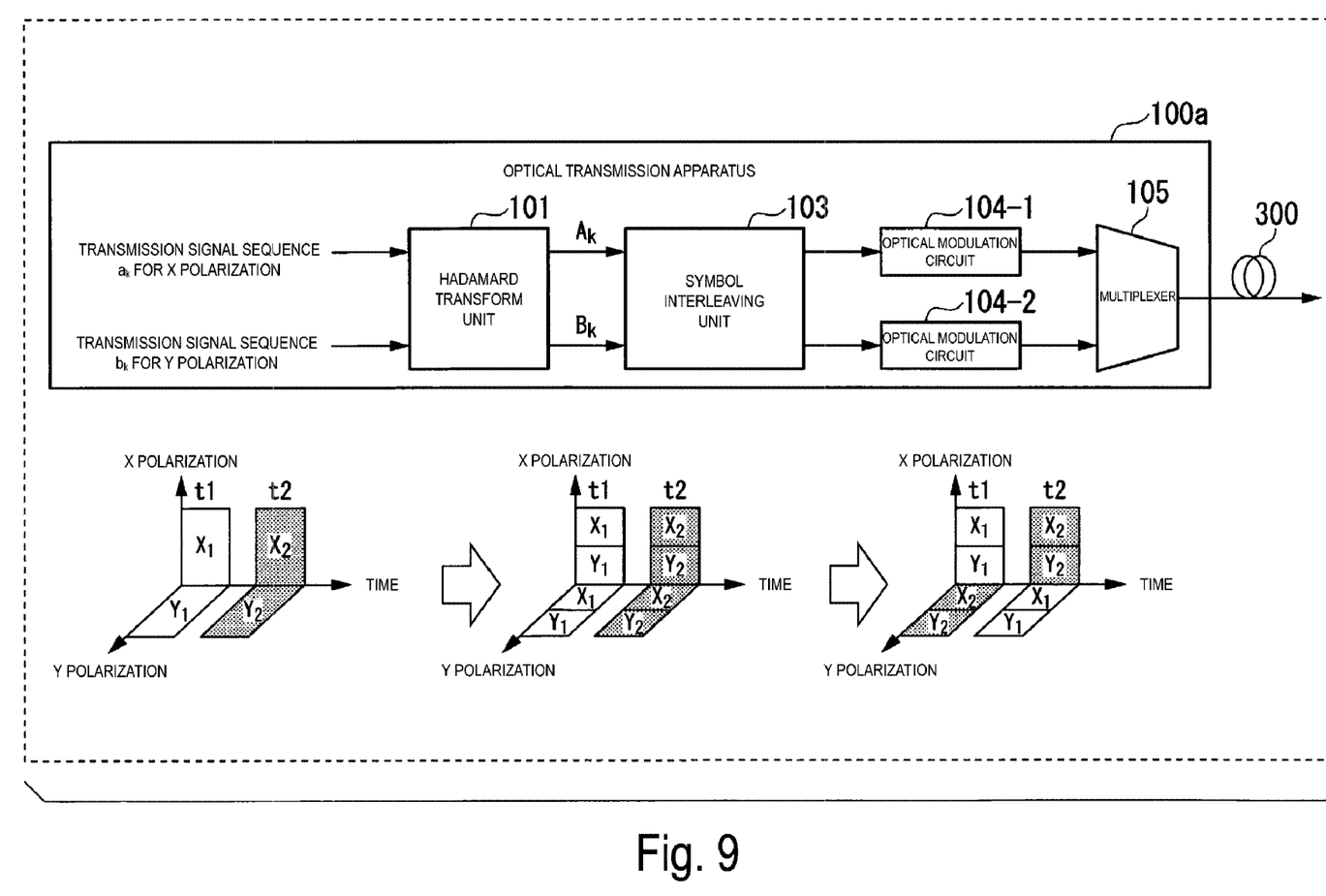
FIG. 9 is a diagram illustrating a technique for removing correlation between polarizations by symbol interleaving.

In addition to adding a delay, as the technique of removing correlation between polarizations, there is a technique in which correlation between polarizations is removed by, for example, expansion of the Hadamard matrix illustrated in FIG. 8. Note that when the technique of expansion of the Hadamard matrix is used, time slots used are not necessarily two adjacent time slots. Alternatively, as illustrated in FIG. 9, there is a technique in which a symbol interleaving unit 103 is provided instead of the delay addition unit 102 to remove correlation between polarizations by symbol interleaving. In this case, interleaving may be performed on any of the polarizations, and time slots used are not necessarily two adjacent time slots.

CITATION LIST

Non Patent Literature

Non Patent Literature 1: Wei-Ren Peng, Takehiro Tsuritani, Itsuro Morita, "ModifiedWalsh-Hadamard Transform for PDL Mitigation", 39th European Conference and Exhibition on Optical Communication (ECOC 2013)

SUMMARY OF THE INVENTION

Technical Problem

In the optical transmission system 500 illustrated in FIG. 5, an optical reception apparatus 200 receives an optical signal transmitted by the optical transmission apparatus 100 through an optical transmission line 300. A demultiplexer 201 of the optical reception apparatus 200 demultiplexes the received optical signal into X polarization and Y polarization. Optical demodulation circuits 202-1 and 202-2 receive the optical signal of X polarization and the optical signal of Y polarization output by the demultiplexer 201, respectively. The optical demodulation circuits 202-1 and 202-2 convert the received optical signals into analog electrical signals, further convert the analog electrical signals into digital electrical signals, and output the digital electrical signals.

An adaptive equalization processing unit 203 provided with an adaptive equalizer (AEQ) receives the signals output by the optical demodulation circuits 202-1 and 202-2 and collectively performs waveform distortion compensation, compensation for delay added by the delay addition unit 102, and inverse Hadamard transform, by adaptive equalization processing. An adaptive equalization processing unit 204 provided with an adaptive equalizer functions as a frequency offset compensation unit 2041 that performs frequency offset compensation processing by adaptive equalization processing. An adaptive equalization processing unit 205 provided with an adaptive equalizer functions as a phase offset compensation unit 2051 that performs phase offset compensation processing by adaptive equalization processing.

In the case of the optical transmission system 500, it is also necessary to obtain an AEQ compensation effect similar to that of a transmission method such as quadrature phase shift keying (QPSK) in which Hadamard transform is not performed. To do so, there is a problem that in the adaptive equalization processing unit 203 included in the optical reception apparatus 200, which performs wavelength distortion compensation, the number of taps of the adaptive equalizer must be increased in accordance with the length of delay added on the transmission side.

In light of the foregoing circumstances, an object of the present invention is to provide a technology capable of demodulating a reception signal without increasing the number of taps in adaptive equalization processing in an optical transmission system employing a polarization diversity scheme using Hadamard transform.

Means for Solving the Problem

One aspect of the present invention is an optical transmission system including: an optical transmission apparatus configured to subject a transmission signal including a plurality of sequences to Hadamard transform to obtain a signal in which a predetermined delay is added to one of the plurality of sequences, optically modulate the obtained signal, and transmit the modulated signal; and an optical reception apparatus configured to demodulate a reception signal received from the optical transmission apparatus by subjecting the reception signal to adaptive equalization processing with a predetermined number of taps, in which the optical reception apparatus includes: an adaptive equalization processing unit configured to subject the reception signal to adaptive equalization processing of wavelength distortion compensation with a number of taps obtained by subtracting a number determined in accordance with the delay from the predetermined number of taps; a delay compensation unit configured to subject the reception signal subjected to the wavelength distortion compensation to delay compensation in accordance with the delay; and an inverse Hadamard transform unit configured to subject the reception signal subjected to the delay compensation to inverse Hadamard transform.

One aspect of the present invention is the above-described optical transmission system further including: a frequency offset compensation unit configured to subject the reception signal subjected to the wavelength distortion compensation to frequency offset compensation before the delay compensation; and a phase offset compensation unit configured to subject the reception signal subjected to the frequency offset compensation by the frequency offset compensation unit to phase offset compensation, in which the delay compensation unit subjects the reception signal subjected to the phase offset compensation to the delay compensation, and the inverse Hadamard transform unit subjects the reception signal subjected to the delay compensation to inverse Hadamard transform with a single fixed tap.

One aspect of the present invention is the above-described optical transmission system, in which the optical transmission apparatus includes a pilot signal insertion unit configured to insert a pilot signal before the Hadamard transform or after addition of the delay, and the adaptive equalization processing unit of the optical reception apparatus performs the adaptive equalization processing using the pilot signal.

One aspect of the present invention is the above-described optical transmission system, in which the pilot signal insertion unit uses a signal subjected to inverse Hadamard transform or a QSPK signal as the pilot signal when the pilot signal is inserted before the Hadamard transform, and uses a signal subjected to Hadamard transform or a QSPK signal as the pilot signal when the pilot signal is inserted after the addition of the delay.

One aspect of the present invention is an optical reception apparatus configured to demodulate a reception signal by subjecting the reception signal to adaptive equalization processing with a predetermined number of taps, the reception signal being received from an optical transmission apparatus, the optical transmission apparatus being configured to subject a transmission signal including a plurality of sequences to Hadamard transform to obtain a signal in which a predetermined delay is added to one of the plurality of sequences, optically modulate the obtained signal, and transmit the modulated signal, the optical reception apparatus including: an adaptive equalization processing unit configured to subject the reception signal to adaptive equalization processing of wavelength distortion compensation with a number of taps obtained by subtracting a number determined in accordance with the delay from the predetermined number of taps; a delay compensation unit configured to subject the reception signal subjected to the wavelength distortion compensation to delay compensation in accordance with the delay; and an inverse Hadamard transform unit configured to subject the reception signal subjected to the delay compensation to inverse Hadamard transform.

One aspect of the present invention is an optical transmission method in an optical transmission system that includes: an optical transmission apparatus configured to subject a transmission signal including a plurality of sequences to Hadamard transform to obtain a signal in which a predetermined delay is added to one of the plurality of sequences, optically modulate the obtained signal, and transmit the modulated signal; and an optical reception apparatus configured to demodulate a reception signal received from the optical transmission apparatus by subjecting the reception signal to adaptive equalization processing with a predetermined number of taps, the optical transmission method including: by the optical reception apparatus, subjecting the reception signal to adaptive equalization processing of wavelength distortion compensation with a number of taps obtained by subtracting a number determined in accordance with the delay from the predetermined number of taps; by the optical reception apparatus, subjecting the reception signal subjected to the wavelength distortion compensation to delay compensation in accordance with the delay: and by the optical reception apparatus, subjecting the reception signal subjected to the delay compensation to inverse Hadamard transform.

Effects of the Invention

According to the present invention, it is possible to demodulate a reception signal without increasing the number of taps in the adaptive equalization processing in an optical transmission system employing a polarization diversity scheme using Hadamard transform.

DESCRIPTION OF EMBODIMENTS

Figure 1:
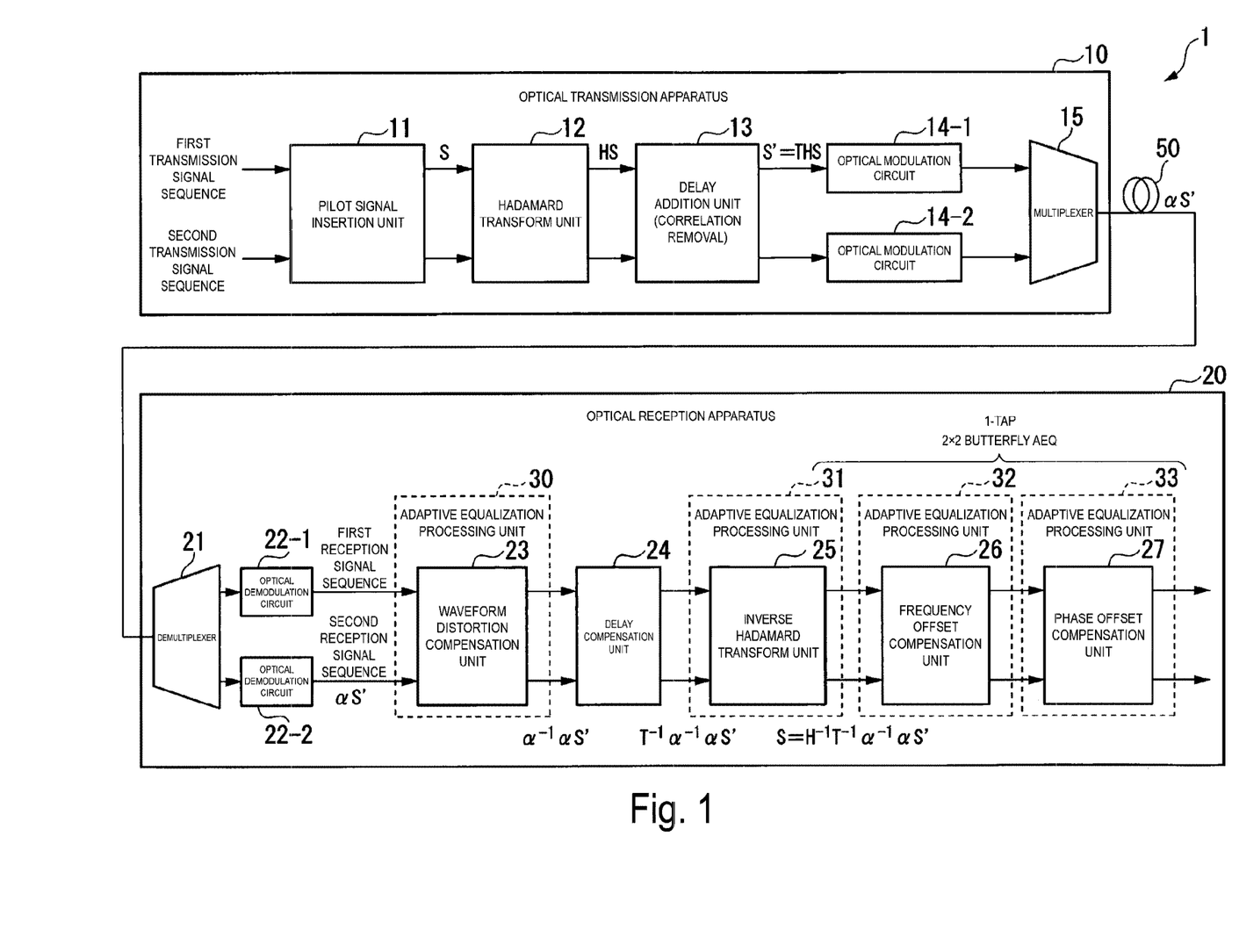
FIG. 1 is a block diagram illustrating a configuration of an optical transmission system according to a present embodiment.

Embodiments of the present invention will be described below with reference to the drawings. FIG. 1 is a block diagram illustrating a configuration of an optical transmission system 1 according to a present embodiment. The optical transmission system 1 includes an optical transmission apparatus 10, an optical reception apparatus 20, and an optical transmission line 50 that connects the optical transmission apparatus 10 and the optical reception apparatus 20. The optical transmission apparatus 10 includes a pilot signal insertion unit 11, an Hadamard transform unit 12, a delay addition unit 13, optical modulation circuits 14-1 and 14-2, and a multiplexer 15. The pilot signal insertion unit 11 receives a signal having two sequences, a first transmission signal sequence and a second transmission signal sequence, and inserts a pilot signal into the received signal.

Figure 2:
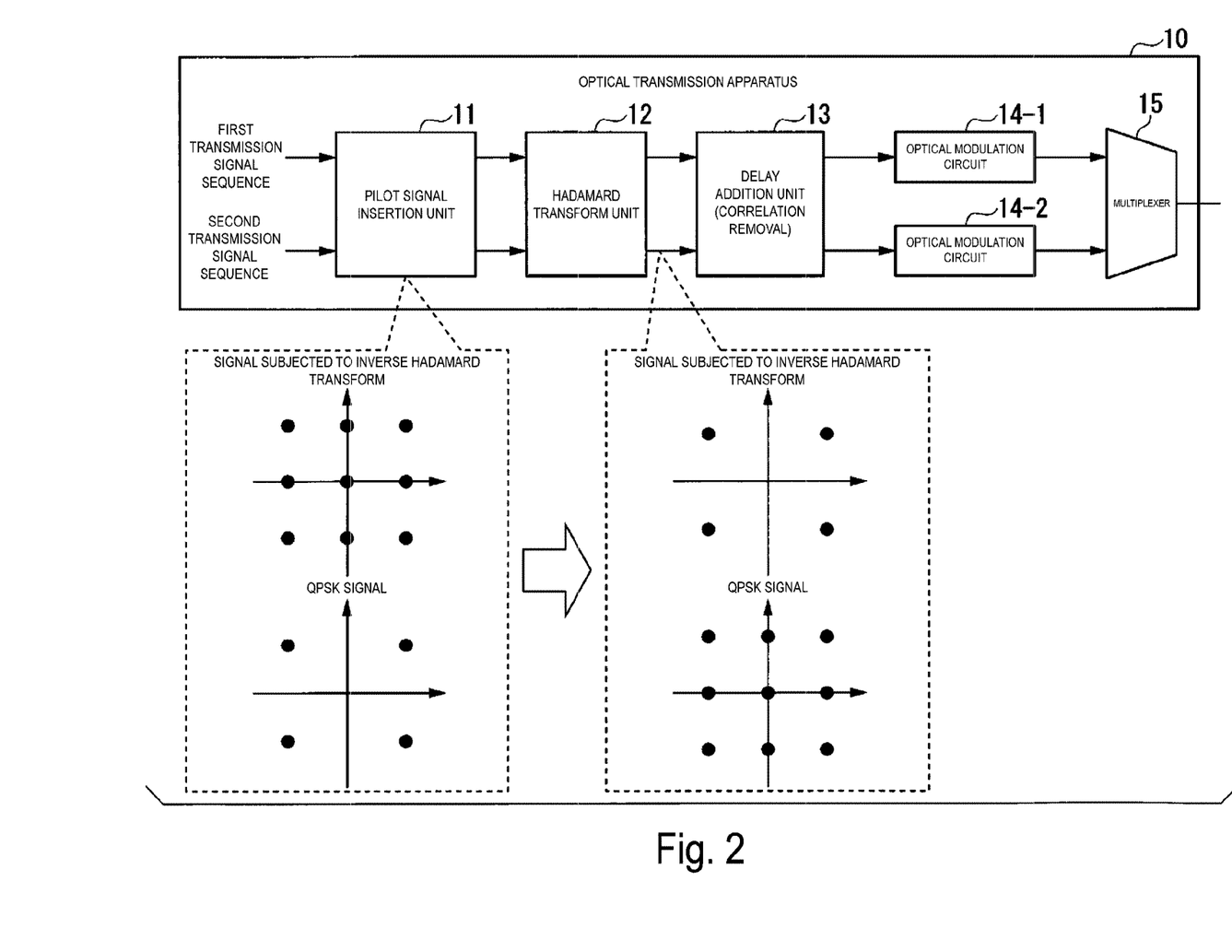
FIG. 2 is a diagram illustrating an example of a pilot signal according to the present embodiment.

Here, the pilot signal insertion unit 11 inserts, for example, a signal subjected to inverse Hadamard transform, a QPSK signal, illustrated in FIG. 2, or the like as a pilot signal.

The Hadamard transform unit 12 receives a transmission signal S output by the pilot signal insertion unit 11, and subjects the transmission signal S to Hadamard transform by applying a matrix H of Equation (1). In other words, the Hadamard transform unit 12 computes H×S, and generates a signal having two sequences including the first transmission signal sequence and the second transmission signal sequence.

The delay addition unit 13 delays a signal (H×S) output by the Hadamard transform unit 12 by a predetermined number of delay symbols $T_d$ to perform the correlation removal described above. The delay addition unit 13 computes T×(H×S) by applying a matrix T represented by Equation (2) below to the signal (H×S) to generate a delay-added transmission signal S☐ As a means of delay addition performed by the delay addition unit 13, for example, a technique by sample delay is applied, and a sample is added to match the number of delay symbols $T_d$.

[Math. 2]

$$T = \begin{bmatrix} \exp\left(jw\frac{T_d}{2}\right) & 0 \\ 0 & \exp\left(-jw\frac{T_d}{2}\right) \end{bmatrix} \quad (2)$$

The optical modulation circuits 14-1 and 14-2 modulate the signal having two sequences included in the delay-added transmission signal S ☐ and convert the electrical signal into an optical signal and output the optical signal. Here, for example, it is assumed that the optical modulation circuit 14-1 generates an X polarization signal and the optical modulation circuit 14-2 generates a Y polarization signal.

The multiplexer 15 multiplexes the X polarization optical signal output by the optical modulation circuit 14-1 and the Y polarization optical signal output by the optical modulation circuit 14-2 and transmits the resulting optical signal to the optical reception apparatus 20 through the optical transmission line 50.

The optical reception apparatus 20 includes a demultiplexer 21, optical demodulation circuits 22-1 and 22-2, a delay compensation unit 24, and four adaptive equalization processing units 30, 31, 32, and 33. The demultiplexer 21 demultiplexes the optical signal received from the optical transmission line 50 into X polarization and Y polarization.

The optical demodulation circuits 22-1 and 22-2 receive the X polarization optical signal and the Y polarization optical signal output by the demultiplexer 21, respectively. The optical demodulation circuits 22-1 and 22-2 convert the received X polarization and Y polarization optical signals into analog electrical signals, and further convert the analog electrical signals into digital electrical signals to output a first reception signal sequence and a second reception signal sequence, respectively.

When the delay-added transmission signal S ☐ is transmitted through the optical transmission line 50, a waveform distortion α occurs. Thus, the signal including the first reception signal sequence and the second reception signal sequence can be expressed as α×S' in which the waveform distortion α is added to the delay-added transmission signal S☐

The adaptive equalization processing unit 30 provided with an adaptive equalizer functions as a waveform distortion compensation unit 23 that compensates for waveform distortion by adaptive equalization processing. The waveform distortion compensation unit 23 receives the first reception signal sequence and the second reception signal sequence and performs waveform distortion compensation by adaptive equalization processing. When processing by the waveform distortion compensation unit 23 is expressed by an arithmetic expression, an inverse matrix $\alpha^{-1}$ of $\alpha$ is applied to cancel out the waveform distortion $\alpha$, and thus the expression becomes $\alpha^{-1} \times (\alpha \times S')$.

The delay compensation unit 24 performs processing of compensating for the delay added by the delay addition unit 13, for example, by a sample delay. In the delay compensation unit 24, for example, information of the number of delay symbols $T_d$ added by the delay addition unit 13 of the optical transmission apparatus 10 is provided in advance, and delay compensation is performed by a matrix $T^{-1}$ shown in Equation (3) below. The delay compensation unit 24 outputs a signal of $T^{-1} \times \alpha^{-1} \times \alpha \times S\square$ after the delay compensation.

[Math. 3]

$$T^{-1} = \begin{bmatrix} \exp\left(-jw\frac{T_d}{2}\right) & 0 \\ 0 & \exp\left(jw\frac{T_d}{2}\right) \end{bmatrix} \quad (3)$$

The adaptive equalization processing unit 31 provided with an adaptive equalizer functions as an inverse Hadamard transform unit 25 that performs inverse Hadamard transform by adaptive equalization processing. The inverse Hadamard transform unit 25 applies a matrix $H^{-1}$ represented by Equation (4) below to the signal of $T^{-1} \times \alpha^{-1} \times \alpha \times S'$ output by the delay compensation unit 24 to perform inverse Hadamard transform. As a result, the inverse Hadamard transform unit 25 outputs a transmission signal $S = H^{-1} \times T^{-1} \times \alpha^{-1} \times \alpha \times S'$.

[Math. 4]

$$H = \frac{1}{\sqrt{2}} \begin{bmatrix} 1 & 1 \\ 1 & -1 \end{bmatrix} \quad (4)$$

The adaptive equalization processing unit 32 provided with an adaptive equalizer functions as a frequency offset compensation unit 26 that performs frequency offset compensation by adaptive equalization processing. The frequency offset compensation unit 26 removes a frequency offset component included in the transmission signal S output by the inverse Hadamard transform unit 25 by adaptive equalization processing.

The adaptive equalization processing unit 33 provided with an adaptive equalizer functions as a phase offset compensation unit 27 that performs phase offset compensation by adaptive equalization processing. The phase offset compensation unit 27 removes a phase offset component included in the transmission signal S from which the frequency offset component has been removed, by adaptive equalization processing.

Note that although the adaptive equalization processing units 33, 31, and 32 may be implemented by individual adaptive equalizers, the adaptive equalization processing unit 33 that performs the inverse Hadamard transform needs to operate in conjunction with the subsequent units, that is, the adaptive equalization processing unit 31 that performs frequency offset compensation and the adaptive equalization processing unit 32 that performs phase offset compensation. Thus, it is desirable to integrate the adaptive equalization processing units 33, 31, and 32 to make a 1-tap adaptive equalizer having a 2×2 butterfly configuration.

The adaptive equalization processing units 30, 31, 32, and 33 described above use a pilot signal included in a reception signal to detect a waveform distortion compensation amount, a compensation amount for Hadamard transform, a frequency offset compensation amount, and a phase offset compensation amount, respectively. The adaptive equalization processing units 30, 31, 32, and 33 perform waveform distortion compensation, inverse Hadamard transform, frequency offset compensation, and phase offset compensation, respectively, based on the waveform distortion compensation amount detected by the adaptive equalization processing unit 30, the compensation amount for Hadamard transform detected by the adaptive equalization processing unit 31, the frequency offset compensation amount detected by the adaptive equalization processing unit 32, and the phase offset compensation amount detected by the adaptive equalization processing unit 33.

For example, in the optical reception apparatus 200 illustrated in FIG. 5, as described above, the adaptive equalization processing unit 203 performs adaptive equalization processing with a prescribed number of taps in the adaptive equalizer provided therein, the number of the taps being increased in accordance with the number of delay symbols $T_d$ added on the transmission side.

In contrast, in the optical reception apparatus 20 of the present embodiment, the delay compensation unit 24 is separated from adaptive equalization processing. With the configuration, the number of taps of the adaptive equalizer included in the adaptive equalization processing unit 30 that performs wavelength distortion compensation can be set to the number of taps obtained by subtracting a number determined in accordance with the number of delay symbols $T_d$ from the prescribed number of taps in the above-described adaptive equalization processing unit 203. In other words, the number of taps of the adaptive equalizer included in the adaptive equalization processing unit 30 can be set to the same number of taps as the number of taps of the adaptive equalizer that is used on the reception side in a case of a transmission method such as QPSK in which Hadamard transform is not performed.

For example, it is assumed that when operation of the adaptive equalization processing by the adaptive equalization processing unit 30 is T-spaced in which a symbol period T is a tap interval, the number of delay symbols $T_d$ is N. In this case, in the adaptive equalization processing unit 30, the number of taps can be reduced by N in the adaptive equalizer provided therein. Here, N is an integer equal to or larger than 1. Furthermore, assuming that when operation of the adaptive equalization processing by the adaptive equalization processing unit 30 is T/2-spaced in which T/2, the half of the symbol period T, is a tap interval, the number of delay symbols $T_d$ is N, the number of taps can be reduced by 2×N.

According to the configuration of the embodiment described above, in the optical transmission system 1, the optical transmission apparatus 10 subjects a transmission signal including a plurality of sequences to Hadamard transform to obtain a signal in which a predetermined delay is added to one of the sequences, modulates the obtained signal optically, transmits the modulated signal, and inserts a pilot signal prior to Hadamard transform. In the optical reception apparatus 20, the delay compensation unit 24 subjects the reception signal to processing of delay compensation in accordance with the delay added by the optical transmission apparatus 10. The inverse Hadamard transform unit 25 subjects the reception signal subjected to delay compensation by the delay compensation unit to processing of inverse Hadamard transform. The adaptive equalization processing units 30, 31, and 32 perform adaptive equalization processing, except processing of delay compensation and processing of inverse Hadamard transform, using the pilot signal with the number of taps obtained by subtracting a number determined in accordance with the delay from the predetermined number of taps. As a result, the reception signal can be demodulated without increasing the number of taps in adaptive equalization processing in the optical transmission system employing the polarization diversity scheme using Hadamard transform.

Note that the above-described optical transmission apparatus 10 includes the pilot signal insertion unit 11, but need not include the pilot signal insertion unit 11. In this case, a pilot signal is not inserted into the transmission signal S, and thus another means that does not utilize a pilot signal must be applied to the optical reception apparatus 20. For example, when a means using a decision directed least mean square (DD-LMS) algorithm is applied to an adaptive equalizer (AEQ) included in the optical reception apparatus 20 to perform processing with constellation after Hadamard transform as a convergence target, it is possible to compensate for a transmission line distortion without using the pilot signal.

According to such a configuration, in the optical transmission system 1, the optical transmission apparatus 10 subjects a transmission signal including a plurality of sequences to Hadamard transform to obtain a signal in which a predetermined delay is added to one of the sequences, optically modulates the obtained signal, and transmits the modulated signal. In the optical reception apparatus 20, the adaptive equalization processing unit 30 performs adaptive equalization processing on a reception signal with the number of taps obtained by subtracting a number determined in accordance with the delay from the predetermined number of taps. The delay compensation unit 24 performs processing of delay compensation in accordance with the delay added by the optical transmission apparatus 10. The inverse Hadamard transform unit 25 performs processing of inverse Hadamard transform. As a result, the reception signal can be demodulated without increasing the number of taps in adaptive equalization processing in the optical transmission system employing the polarization diversity scheme using Hadamard transform.

Figure 3:
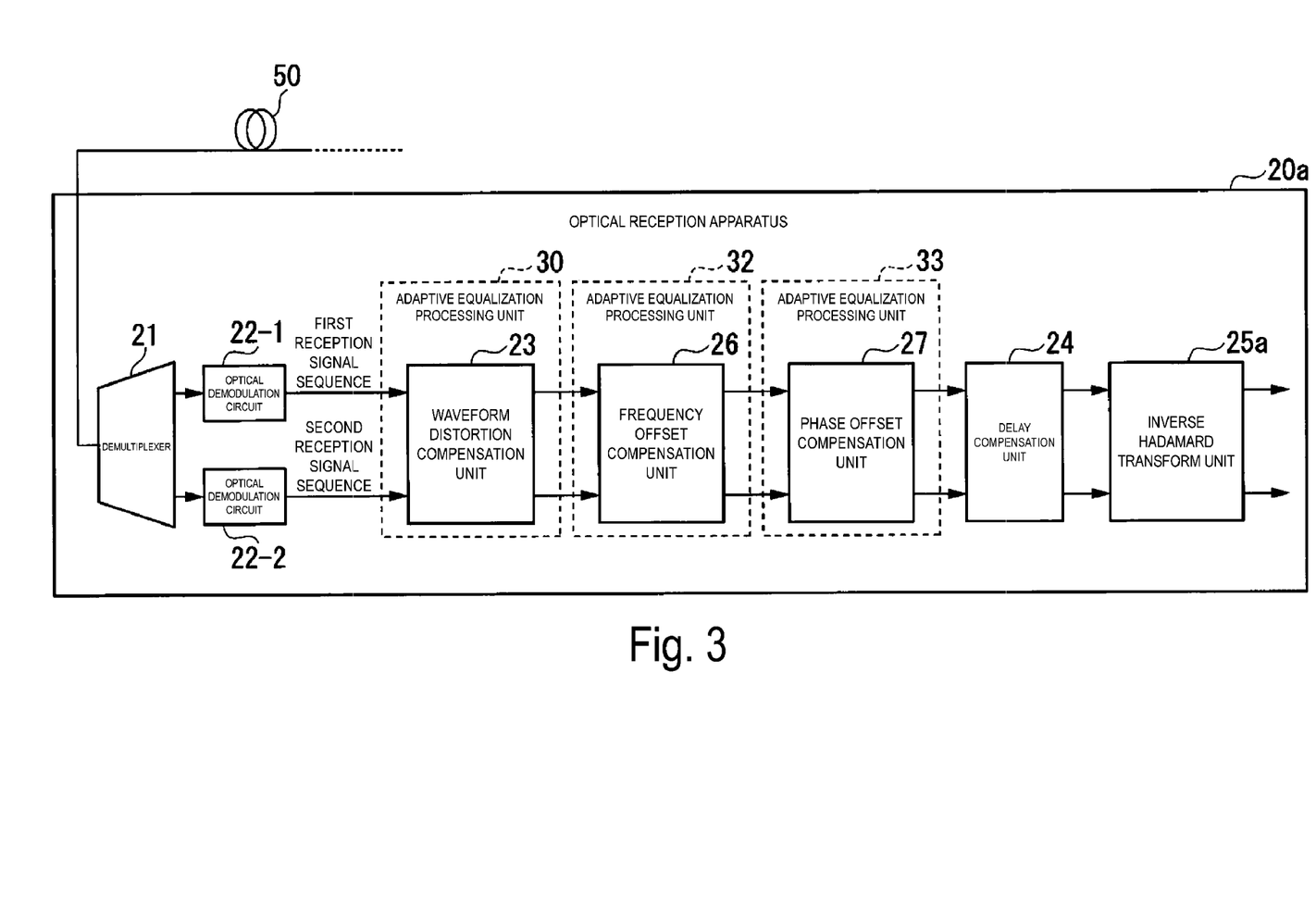
FIG. 3 is a block diagram illustrating a configuration of an optical reception apparatus according to another configuration example of the present embodiment.

Alternatively, the optical reception apparatus 20 described above may be replaced with an optical reception apparatus 20a as illustrated in FIG. 3. The optical reception apparatus 20a includes the adaptive equalization processing unit 30, 32, and 33 before the delay compensation unit 24. As a result, frequency offset compensation and phase offset compensation are performed before inverse Hadamard transform, and thus an inverse Hadamard transform unit 25a is capable of performing processing of inverse Hadamard transform with a single fixed tap rather than adaptive equalization processing.

Figure 4:
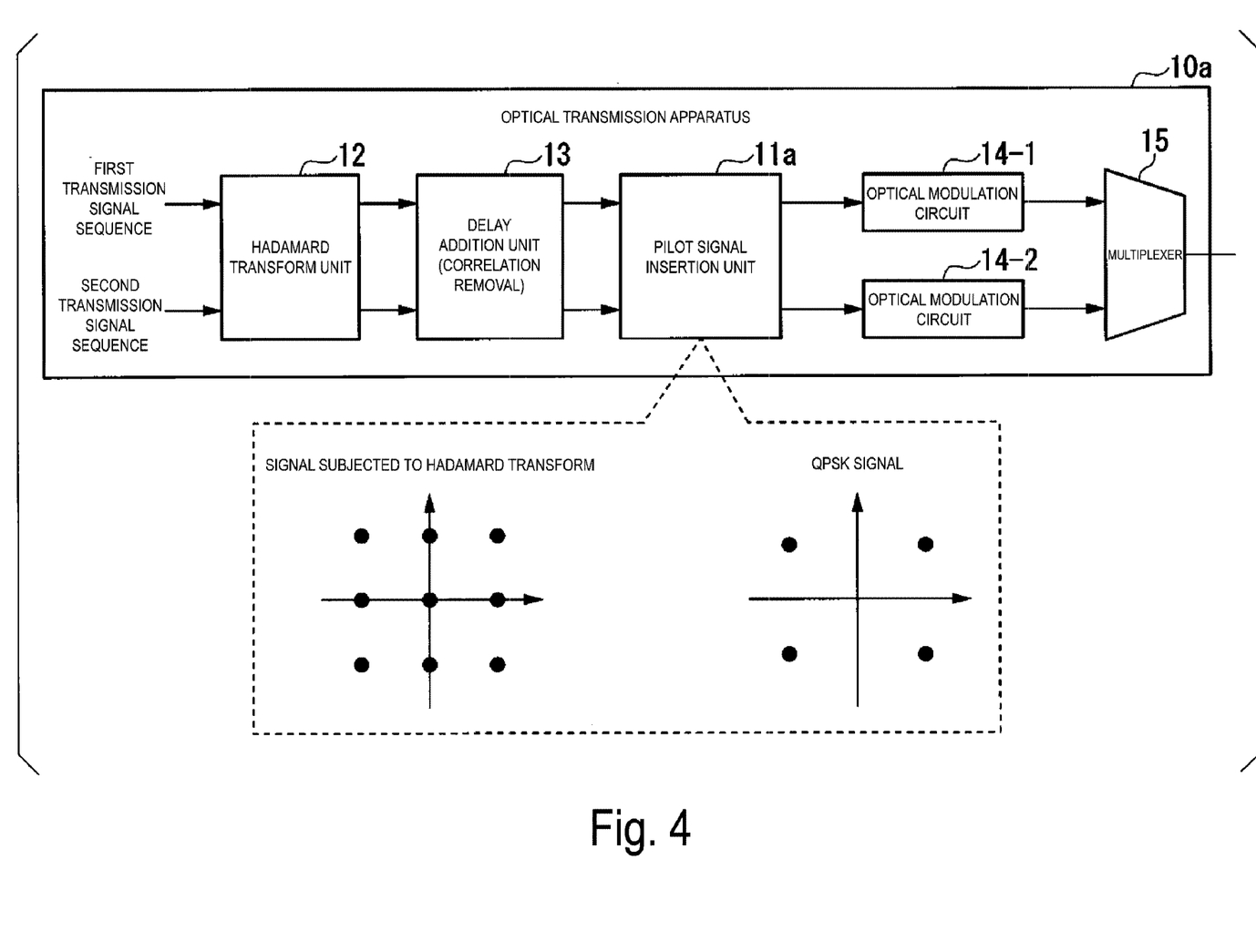
FIG. 4 is a block diagram illustrating a configuration of an optical transmission apparatus according to still another configuration example of the present embodiment.

Furthermore, the optical transmission apparatus 10 described above may be replaced with an optical transmission apparatus 10a as illustrated in FIG. 4. The optical transmission apparatus 10a includes a pilot signal insertion unit 11a between the delay addition unit 13 and the optical modulation circuits 14-1 and 14-2. The pilot signal insertion unit 11a inserts, for example, a signal subjected to Hadamard transform, a QPSK signal, illustrated in FIG. 4, or the like as a pilot signal. In the optical transmission apparatus 10, a time difference of the pilot signal is generated between polarizations because Hadamard transform and delay addition are performed after insertion of the pilot signal. In contrast, in the optical transmission apparatus 10a, the pilot signal is inserted after Hadamard transform and delay addition, and thus a time difference of the pilot signal is not generated between polarizations. As a result, in the optical reception apparatus 20 and 20a, the pilot signal can be easily detected.

Furthermore, although in the embodiment described above, the optical reception apparatus 20 includes the adaptive equalization processing units 32 and 33 as illustrated in FIG. 1, the adaptive equalization processing units 31 and 32 may be integrated to provide an adaptive equalization processing unit that performs processing of inverse Hadamard transform and frequency offset compensation using one equalizer. Alternatively, the adaptive equalization processing units 32 and 33 may be integrated to provide an adaptive equalization processing unit that performs processing of frequency offset compensation and phase offset compensation using one adaptive equalizer.

Furthermore, although in the above-described embodiment, the optical reception apparatus 20a includes the adaptive equalization processing units 30, 32, and 33 as illustrated in FIG. 3, the adaptive equalization processing units 30, 32, and 33 may be integrated to provide an adaptive equalization processing unit that performs processing of wavelength distortion compensation, frequency offset compensation, and phase offset compensation using one adaptive equalizer.

In addition, in the optical reception apparatus 20 and 20a according to the embodiment described above, the following five processing operations are all linear operations, and thus the order of the processing operations may be freely changed. The five processing operations refer to processing of waveform distortion compensation by the waveform distortion compensation unit 23, processing of delay compensation by the delay compensation unit 24, processing of inverse Hadamard transform by the inverse Hadamard transform unit 25, processing of frequency offset compensation by the frequency offset compensation unit 26, and processing of phase offset compensation by the phase offset compensation unit 27.

In the above-described embodiment, as an example, a signal having two sequences is transmitted, but a signal having three or more sequences may be transmitted.

Note that the delay compensation unit 24 is configured to perform delay compensation by a sample delay, but if the delay addition unit 13 of the optical transmission apparatus 10 adds a delay by symbol interleaving, the delay compensation unit 24 compensates for the delay by symbol interleaving.

The pilot signal insertion units 11 and 11a, the Hadamard transform unit 12, and the delay addition unit 13 of the optical transmission apparatuses 10 and 10a, and the waveform distortion compensation unit 23, the delay compensation unit 24, the inverse Hadamard transform units 25 and 25a, the frequency offset compensation unit 26, and the phase offset compensation unit 27 of the optical reception apparatuses 20 and 20a in the optical transmission system 1 according to the embodiment described above may be implemented by a computer. This may be achieved by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. Furthermore, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 Optical transmission system
10 Optical transmission apparatus
11 Pilot signal insertion unit
12 Hadamard transform unit
13 Delay addition unit
14-1, 14-2 Optical modulation circuit
15 Multiplexer
20 Optical reception apparatus
21 Demultiplexer
22-1, 22-2 Optical demodulation circuit
23 Waveform distortion compensation unit
24 Delay compensation unit
25, 25a Inverse Hadamard transform unit
26 Frequency offset compensation unit
27 Phase offset compensation unit
30, 31, 32, 33 Adaptive equalization processing unit

The invention claimed is:

1. An optical transmission system comprising:
an optical transmission apparatus configured to subject a transmission signal including a plurality of sequences to Hadamard transform to obtain a signal in which a predetermined delay is added to one of the plurality of sequences, optically modulate the obtained signal, and transmit the modulated signal; and
an optical reception apparatus configured to demodulate a reception signal received from the optical transmission apparatus by subjecting the reception signal to adaptive equalization processing with a predetermined number of taps, wherein
the optical reception apparatus includes:
an adaptive equalization processing unit configured to subject the reception signal to adaptive equalization processing of wavelength distortion compensation with a number of taps obtained by subtracting a number determined in accordance with a delay from the predetermined number of taps;
a delay compensation unit configured to subject the reception signal subjected to the wavelength distortion compensation to delay compensation in accordance with the delay; and
an inverse Hadamard transform unit configured to subject the reception signal subjected to the delay compensation to inverse Hadamard transform.

2. The optical transmission system according to claim 1, further comprising:
a processor; and
a non-transitory storage medium having computer program instructions stored thereon, when executed by the processor, cause the processor to:
subject the reception signal subjected to the wavelength distortion compensation to frequency offset compensation before the delay compensation; and
subject the reception signal subjected to the frequency offset compensation to phase offset compensation, wherein
subjects the reception signal subjected to the phase offset compensation to the delay compensation, and
subjects the reception signal subjected to the delay compensation to the inverse Hadamard transform with a single fixed tap.

3. The optical transmission system according to claim 1, wherein the optical transmission apparatus is configured to insert a pilot signal before the Hadamard transform or after addition of the delay, and performs the adaptive equalization processing using the pilot signal.

4. The optical transmission system according to claim 3, wherein the optical transmission apparatus uses a signal subjected to the inverse Hadamard transform or a QSPK signal as the pilot signal when the pilot signal is inserted before the Hadamard transform, and uses a signal subjected to the Hadamard transform or a QSPK signal as the pilot signal when the pilot signal is inserted after the addition of the delay.

5. An optical reception apparatus configured to demodulate a reception signal by subjecting the reception signal to adaptive equalization processing with a predetermined number of taps, the reception signal being received from an optical transmission apparatus, the optical transmission apparatus being configured to subject a transmission signal including a plurality of sequences to Hadamard transform to obtain a signal in which a predetermined delay is added to one of the plurality of sequences, optically modulate the obtained signal, and transmit the modulated signal, the optical reception apparatus comprising:
an adaptive equalization processing unit configured to subject the reception signal to adaptive equalization processing of wavelength distortion compensation with a number of taps obtained by subtracting a number determined in accordance with a delay from the predetermined number of taps;
a delay compensation unit configured to subject the reception signal subjected to the wavelength distortion compensation to delay compensation in accordance with the delay; and
an inverse Hadamard transform unit configured to subject the reception signal subjected to the delay compensation to inverse Hadamard transform.

6. An optical transmission method in an optical transmission system, the optical transmission system including: an optical transmission apparatus configured to subject a transmission signal including a plurality of sequences to Hadamard transform to obtain a signal in which a predetermined delay is added to one of the plurality of sequences, optically modulate the obtained signal, and transmit the modulated signal; and an optical reception apparatus configured to demodulate a reception signal received from the optical transmission apparatus by subjecting the reception signal to adaptive equalization processing with a predetermined number of taps, the optical transmission method comprising:
Subjecting, by the optical reception apparatus, the reception signal to adaptive equalization processing of wavelength distortion compensation with a number of taps obtained by subtracting a number determined in accordance with a delay from the predetermined number of taps;
Subjecting, by the optical reception apparatus, the reception signal subjected to the wavelength distortion compensation to delay compensation in accordance with the delay; and
Subjecting, by the optical reception apparatus, the reception signal subjected to the delay compensation to inverse Hadamard transform.

* * * * *